United States Patent [19]

Tada

[11] Patent Number: 4,936,601
[45] Date of Patent: Jun. 26, 1990

[54] ACCELERATION SENSOR AND SAFETY BELT RETRACTOR HAVING THE SENSOR

[75] Inventor: Tatsuo Tada, Fujisawa, Japan

[73] Assignee: Nippon Seiko Kabushiki Kaisha, Tokyo, Japan

[21] Appl. No.: 375,477

[22] Filed: Jul. 5, 1989

[30] Foreign Application Priority Data

Jul. 8, 1988 [JP] Japan ............................ 63-89959[U]

[51] Int. Cl.⁵ ............................................. B60R 21/10
[52] U.S. Cl. ..................................... 280/806; 280/807
[58] Field of Search ................................ 280/806, 807

[56] References Cited

U.S. PATENT DOCUMENTS

| 4,585,184 | 4/1986 | Kawaguchi et al. | 280/806 |
| 4,726,540 | 2/1988 | Ches et al. | 280/806 |
| 4,757,954 | 7/1988 | Doty | 280/806 |
| 4,773,613 | 9/1988 | Kawai et al. | 280/806 |

Primary Examiner—Kenneth R. Rice
Attorney, Agent, or Firm—Wegner & Bretschneider

[57] ABSTRACT

An acceleration sensor comprises a first sensor unit, and a second sensor unit. The first and second sensor units can be selectively assembled in a first manner that the first sensor unit is inserted from one side thereof into the second sensor unit, wherein the former is directed in a first direction with respect to the latter, and in a second manner that the first sensor unit is inserted from a side opposite to the one side thereof into the second sensor unit, wherein the former is directed in a second direction opposite to the first direction with respect to the latter. The first sensor unit assembled with the second sensor unit in the first manner is symmetrical with the first sensor unit assembled with the second sensor unit in the second manner with respect to the second sensor unit. A safety belt retractor incorporates an acceleration sensor constructed as above. The second sensor unit may be two types, one of which can be assembled with the first sensor unit only in the first manner, and the other only in the second manner.

8 Claims, 7 Drawing Sheets

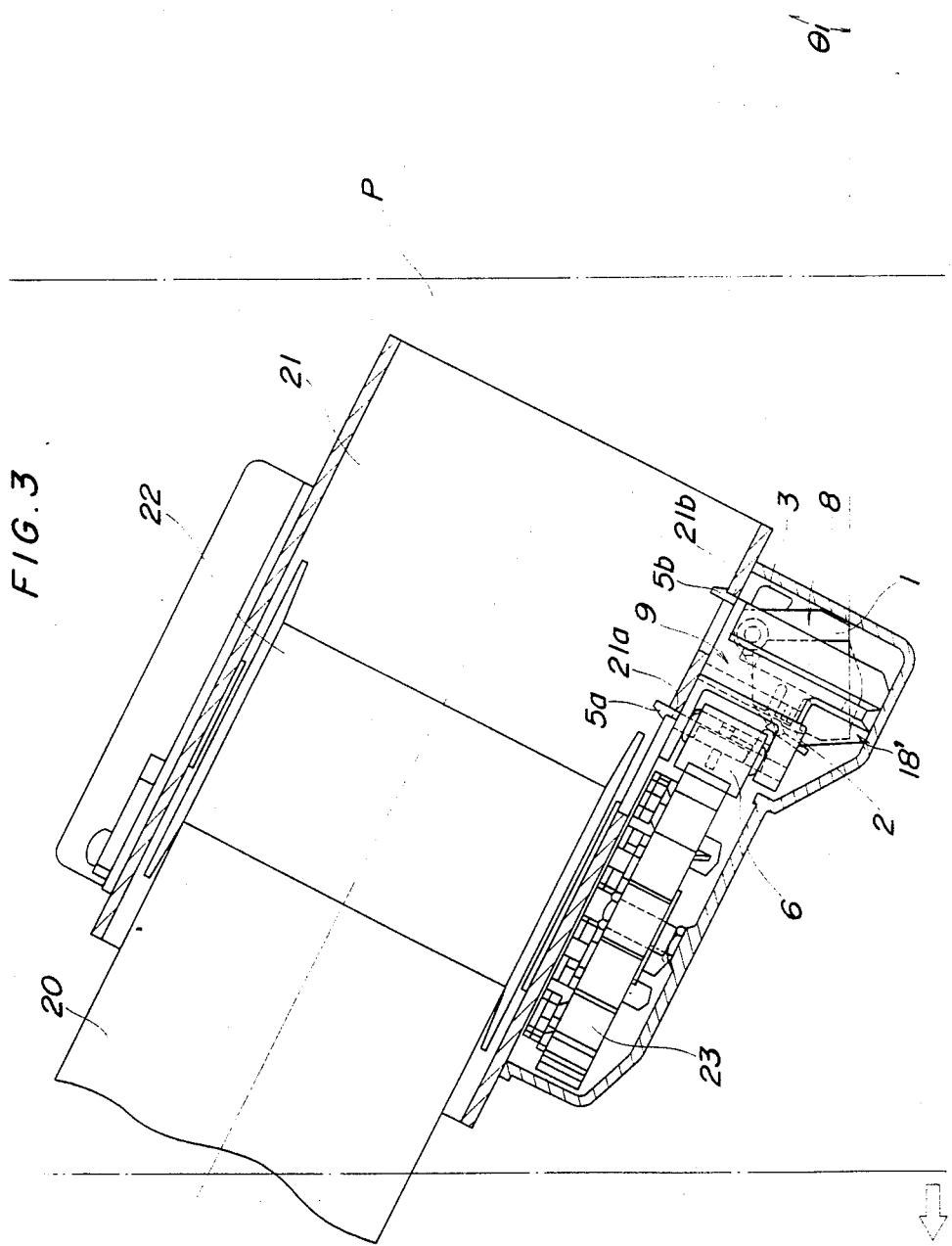

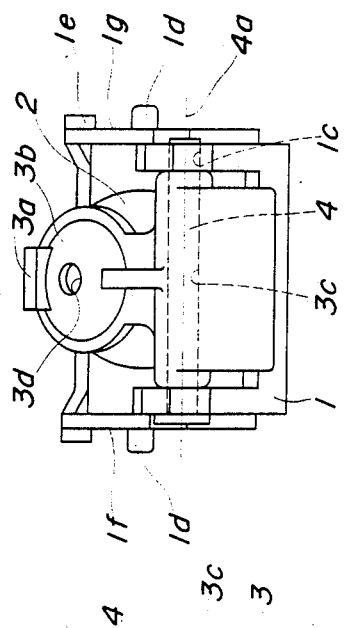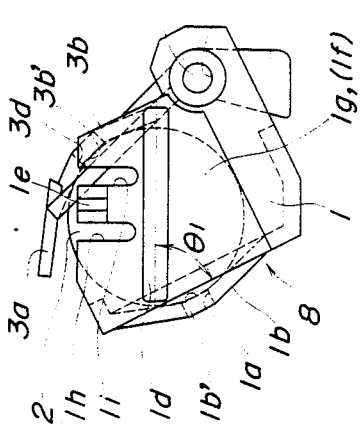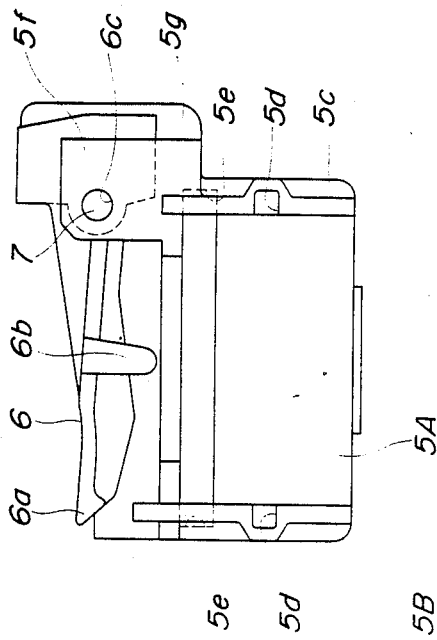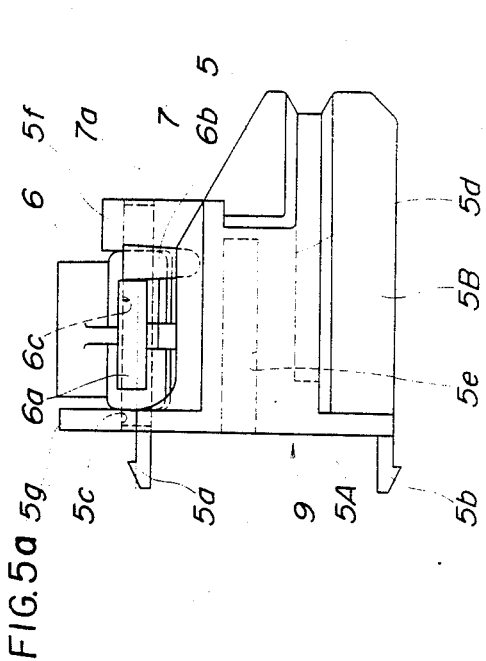

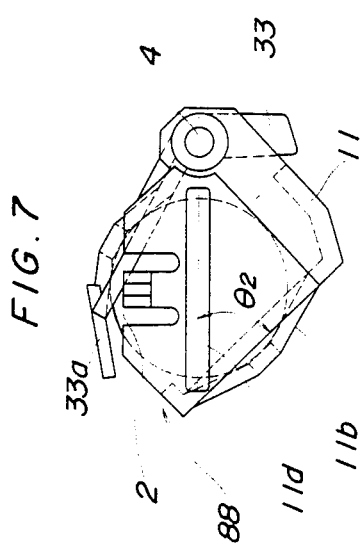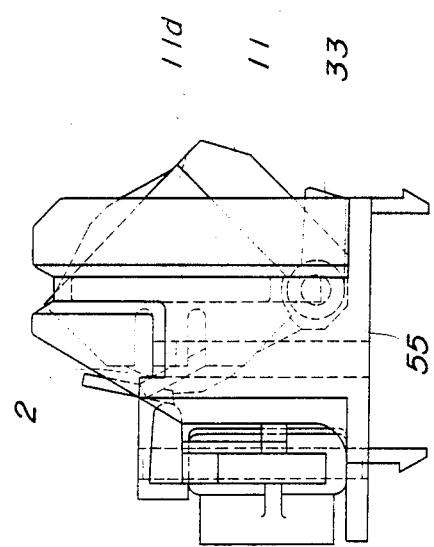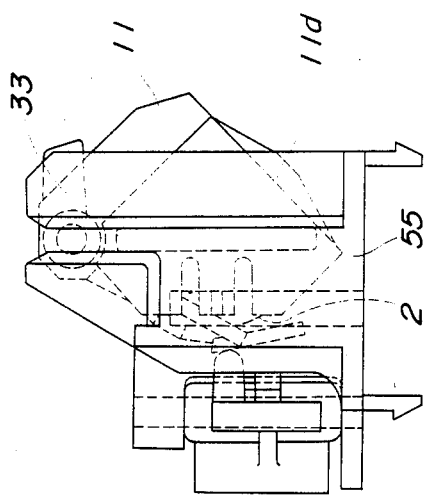

ACCELERATION SENSOR AND SAFETY BELT RETRACTOR HAVING THE SENSOR

BACKGROUND OF THE INVENTION

This invention relates to an acceleration sensor which has a pair of sensor units capable of being put together into two different assemblies being symmetrical in shape with each other, and a safety belt retractor incorporating the same sensor.

Conventionally, safety belt retractors are known which are provided with a locking device which is sensitive to abnormal acceleration or inclination of the vehicle in an emergency and locks a takeup shaft on which a webbing is wound, against rotation to prevent unwinding of the webbing. Some retractors of this type employ acceleration sensors using ball weights as inertia means in order to sense acceleration or inclination of the vehicle. In most sensors of this type, the ball weight is moved in response to acceleration of the vehicle above a certain magnitude or inclination of the vehicle above a certain angle, to actuate the locking device. To ensure proper functioning of the acceleration sensor of this type, it is an essential requisite that the sensor, e.g. its ball weight, should be positioned so as to function without fail when a predetermined emergency condition is fulfilled.

However, in vehicles such as automobiles in which safety belts are widely used, if a retractor for a right-side occupant's seat, which is designed to be inclined forwardly downward when it is mounted in the vehicle, is used at a left-side occupant seat, it has to be inclined rearwardly downwardly when it is mounted at the left-side occupant's seat, failing to properly function in an emergency. Therefore, two kinds of retractors have to be provided for use at the right-side and left-side seats, respectively. Further, the sensor and the retractor body have to be designed in two different shapes for respective use at the right-side and left-side occupant's seats so as to properly function upon fulfillment of the predetermined emergency condition. That is, the sensor and the retractor body are required to have different component parts between the right-side seat and the left-side seat, which renders their mounting into the vehicle complicated, and causes increased costs.

SUMMARY OF THE INVENTION

It is an object of the invention to provide an acceleration sensor and a safety belt retractor having same, which can be used at both right-side and left-side occupant's seats in an vehicle, making it unnecessary to provide two kinds of sensors and retractors and hence simplify the manufacture control and the mounting operation, resultingn in reduced costs.

A further object of the invention is to provide an acceleration sensor and a safety belt retractor having same, which enables to mount the same kind of retractor in different angle positions and hence prevent coupling wrong sensors and retractor bodies together, merely by altering only part of the component parts thereof.

To attain the above first-mentioned object, the present invention provides an acceleration sensor comprising:
 a first sensor unit having acceleration sensing means, and first mounting means; and
 a second sensor unit having actuator actuatable in response to the acceleration sensing means, and second mounting means engageable with the first mounting means;
 the first and second mounting means being engageable with each other to selectively assemble the first and second sensor units in a first manner that the first sensor unit is inserted from one side thereof into the second sensor unit, wherein the first sensor unit is directed in a first direction with respect to the second sensor unit, and in a second manner that the first sensor unit is inserted from a side opposite to the one side thereof into the second sensor unit, wherein the first sensor unit is directed in a second direction opposite to the first direction with respect to the second sensor unit, the first sensor unit assembled with the second sensor unit in the first manner being symmetrical with the first sensor unit assembled with the second sensor unit in the second manner with respect to the second sensor unit.

Preferably, the first sensor unit comprises a spherical weight forming the acceleration sensing means, a first sensor casing accommodating the spherical weight, and a first sensor arm actuatable in response to movement of the spherical weight, and the second sensor unit comprises a second sensor casing combined with the first sensor casing, and a second sensor arm forming the actuator means and actuatable in response to actuation of the first sensor arm.

Further preferably, the first mounting means comprises at least one first protuberance formed on the first sensor casing, and at least one second protuberance formed on the first sensor casing at an axially central portion thereof, and
 the second mounting means comprises at least one first recess formed in the second sensor casing, the at least one first protuberance being disengageably engaged, respectively, in the at least one first recess and cooperating therewith to serve as guide means for causing the first sensor casing to be engaged into the second sensor casing, and at least one second recess formed in the second sensor casing at such a location that it engages a respective one of the at least one second protuberance when the first sensor casing is brought into a predetermined position within the second sensor casing.

Further, to attain the above first-mentioned object, the present invention also provides a safety belt retractor for use in a vehicle, comprising:
 a base;
 a webbing takeup shaft rotatably mounted on the base;
 an acceleration sensor constructed as above; and
 means responsive to the actuator means of the acceleration sensor for inhibiting rotation of the takeup shaft in a direction of webbing being unwound;
 the retractor being mounted in the vehicle in a first position when the first and second sensor units of the acceleration sensor are assembled in the first manner, and in a second position symmetrical with the first position when the first and second sensor units are assembled in the second manner.

To attain the above second-mentioned object, the present invention provides an acceleration sensor comprising:
 a first sensor unit having acceleration sensing means, and first mounting means;
 a second sensor unit having first actuator means actuatable in response to the acceleration sensing means, and second mounting means engageable with the first mounting means; and a third sensor unit having second actuator means responsive to the acceleration sensing means, and second mounting means engageable with the first mounting means;

the first and second mounting means being engageable with each other to assemble the first and second sensor units solely in a first manner that the first sensor unit is inserted from one side thereof into the second sensor unit, wherein the first sensor unit is directed in a first direction with respect to the second sensor unit;

the first and third mounting means being engageable with each other to assemble the first and third sensor units solely in a second manner that the first sensor unit is inserted from a side opposite to the one side thereof into the third sensor unit, wherein the first sensor unit is directed in a second direction opposite to the first direction with respect to the third sensor unit if the latter is directed in the same direction as the second sensor unit.

To attain the second-mentioned object, a safety belt retractor for use in a vehicle is provided which comprises:

a base;

a webbing takeup shaft rotatably mounted on the base;

an acceleration sensor as constructed above;

means responsive to the first or second actuator means of the acceleration sensor for inhibiting rotation of the takeup shaft in a direction of webbing being unwound;

the retractor being mounted in the vehicle in a first position when the first and second sensor units of the acceleration sensor are assembled in the first manner, and in a second position symmetrical with the first position when the first and third sensor units are assembled in the second manner.

The above and other objects, features, and advantages of the invention will be more apparent from the ensuing detailed description taken in conjunction with the accompanying drawings.

BRIEF DESCRIPTION OF THE DRAWINGS

FIG. 3 is a view similar to FIG. 1, showing the retractor mounted at a left-side occupant's seat in a vehicle compartment;

Figure 6B:
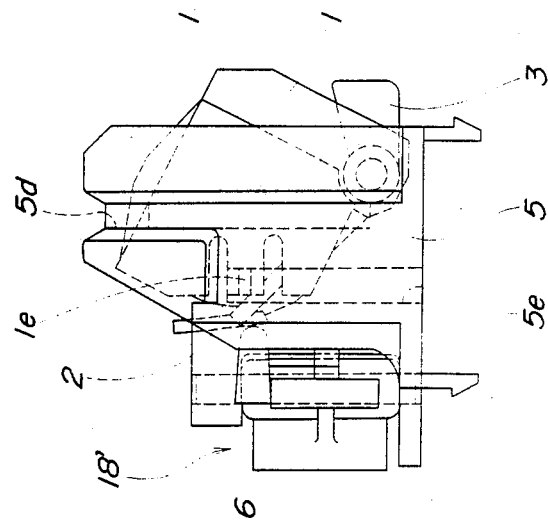
Figure 6A:
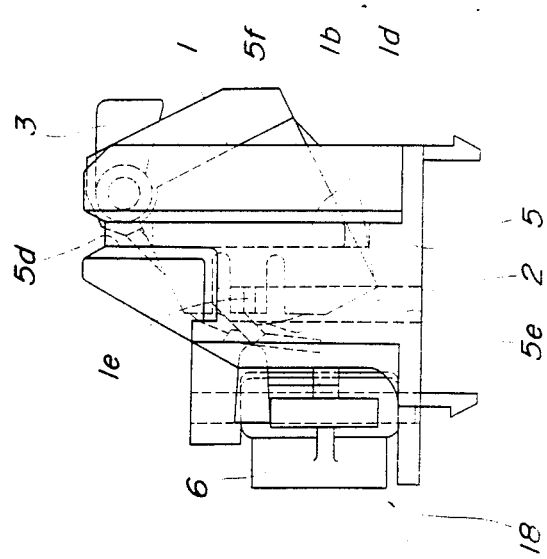
Figure 9:
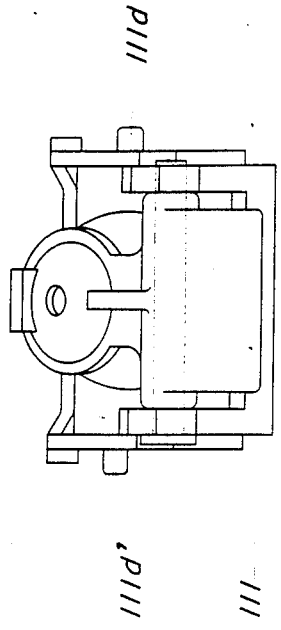
Figure 10B:
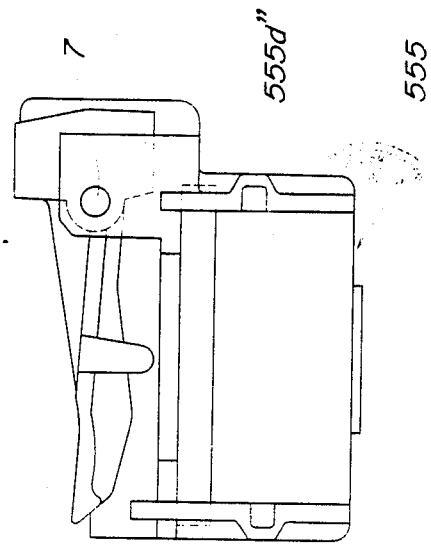
Figure 10A:
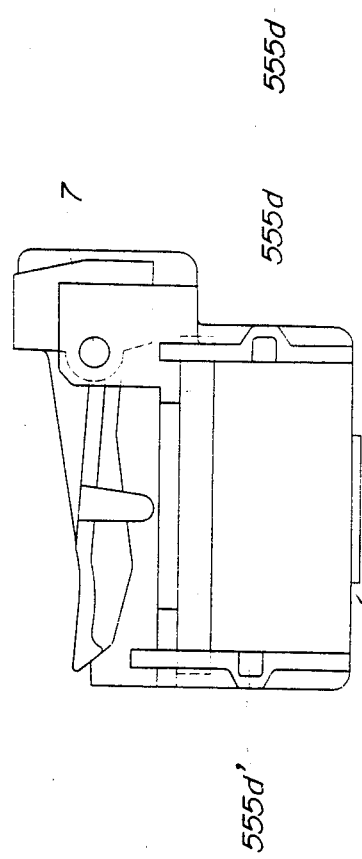

(a) of FIG. 4 is a side view showing a first sensor unit of the acceleration sensor according to a first embodiment of the invention;

(b) of FIG. 4 is a front view of same;

(a) of FIG. 5 is a side view showing a second sensor unit of the sensor according to the first embodiment of the invention;

(b) of FIG. 5 is a front view of same;

(a) of FIG. 6 is a side view of an assembly of the first and second sensor units according to the first embodiment;

(b) of FIG. 6 is a view similar to (a) of FIG. 6, showing another type of assembly of the first and second sensor units put together in a different direction from that in (a) of FIG. 6;

FIG. 7 is a side view of a first sensor unit of an acceleration sensor according to a second embodiment of the invention;

(a) of FIG. 8 is a side view showing another type of assembly of the first and second sensor units according to the second embodiment;

(b) of FIG. 8 is a view similar to (a) of FIG. 8, showing another type of assembly of the first and second sensor units put together in a different direction from that in (a) of FIG. 8;

FIG. 9 is a front view showing a first sensor unit of an acceleration sensor according to a third embodiment of the invention;

(a) of FIG. 10 is a front view showing a first type of the second sensor unit according to the third embodiment; and (b) of FIG. 10 is a view similar to (a) of FIG. 10, showing a second type of the second sensor unit according to the third embodiment.

DETAILED DESCRIPTION

The invention will now be described in detail with reference to the drawings showing preferred embodiments thereof.

Figure 1:
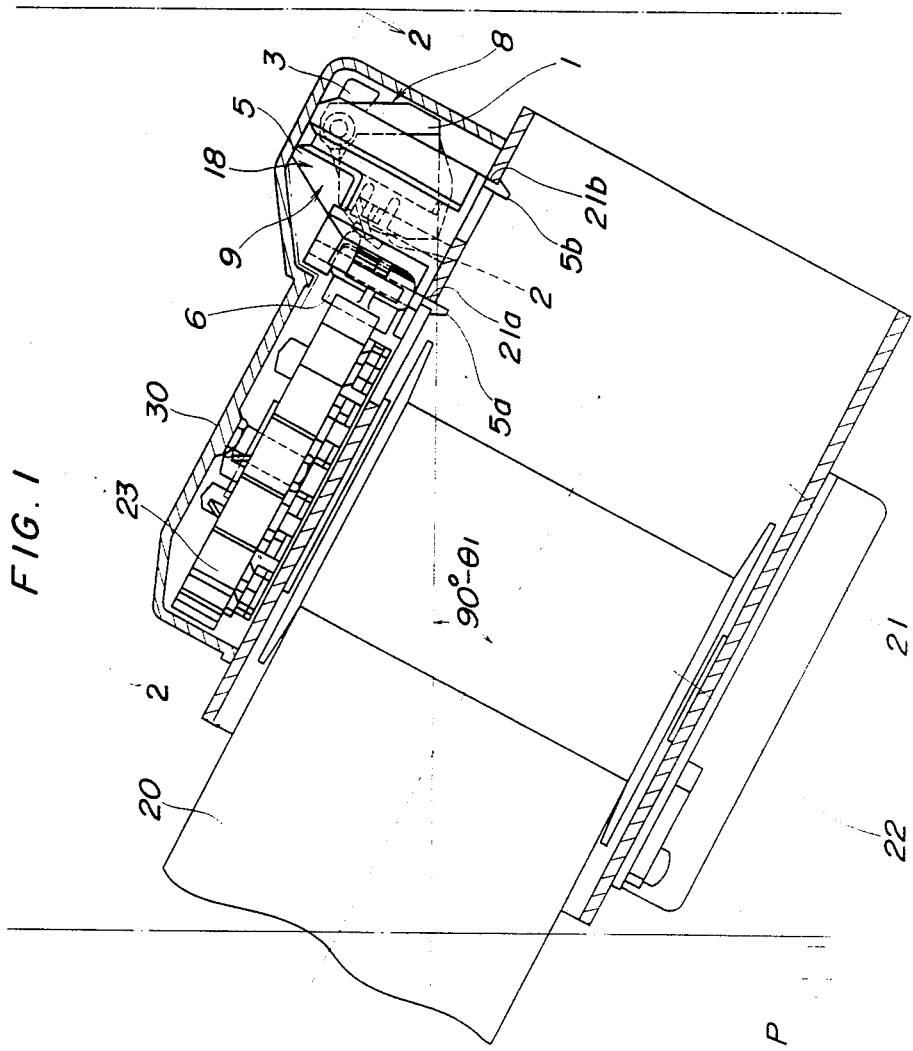
FIG. 1 is a sectional view showing essential parts of a retractor mounted at a right-side occupant's seat in a vehicle compartment, incorporating an acceleration sensor, according to the invention.
Figure 2:
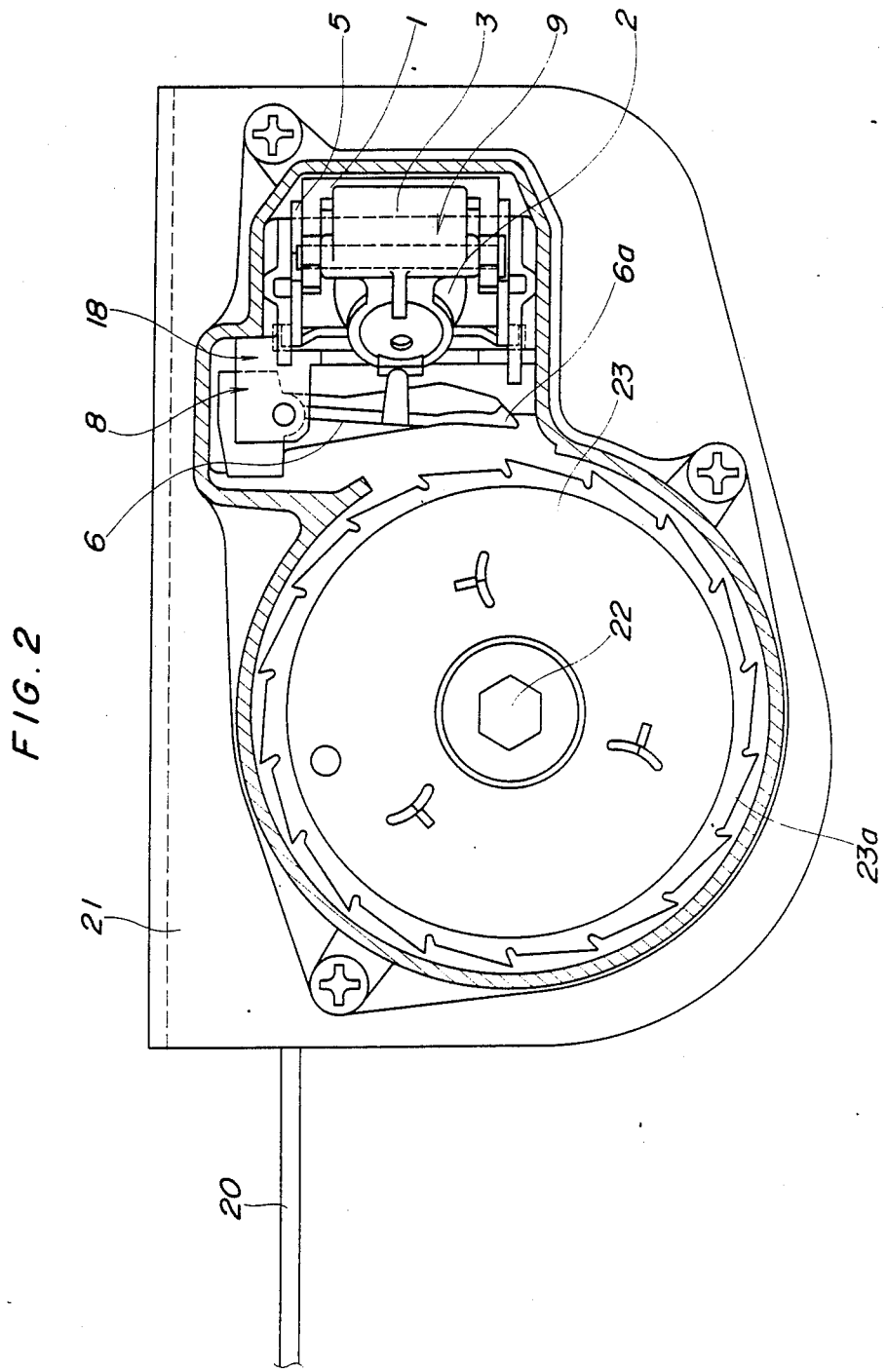
FIG. 2 is a sectional view taken along line II—II in FIG. 1.

FIG. 1 through FIG. 6 illustrate a first embodiment of the invention. Referring first to FIGS. 1 and 2, reference numeral 18 designates a sensor assembly as an acceleration sensor according to the invention, which is comprised of a first sensor unit 8, and a second sensor unit 9. Reference numeral 20 designates a webbing which is wound on a takeup shaft 22. The takeup shaft 22 is in turn rotatably mounted on a retractor base 21 fixed to the body of a vehicle (e.g. a pillar P of the vehicle body) by suitable means, not shown. Mounted on an end of the takeup shaft 22 is a ratchet wheel 23 which has its peripheral edge formed with ratchet teeth 23a. The ratchet wheel 23 and the sensor assembly 18 are accommodated within a housing 30 mounted on a side wall of the retractor base 21.

As best shown in (a) and (b) of FIG. 4, the first sensor unit 8 is mainly composed of a first sensor casing 1, a spherical weight or ball 2, and a first sensor arm 3. The casing 1 and the arm 3 are each formed of a synthetic resin molding.

The first sensor casing 1 has a bottom wall 1b shown in an inclined position, and having its inner surface formed with a depression 1b' corresponding in curvature to the ball 2. The depression 1b has a central opening 1a formed therein. Opposite lateral side walls 1f and 1g vertically extend from the bottom wall 1b and are formed with through holes 1c, 1c through which a pin 4 is penetrated, at an end thereof remote from the bottom wall 1b. Further, the side walls 1f, 1g each have protuberances 1d and 1e at their outer surfaces. Each protuberance 1d is in the form of an elongate ridge horizontally extending along a central portion of the side wall 1f, 1g at a predetermined angle $\theta 1$ with respect to the bottom wall 1b. Each protuberance 1e is defined between two adjacent cutouts 1h and 1i in an upper edge of the side wall 1f, 1g and extends at right angles to the protuberance 1d. The protuberance 1e is located at a location corresponding to a central portion of the protuberance 1d in the axial direction of the casing 1.

The first sensor arm 3 has a ball receiving portion 3b having its inner surface formed with a depression 3b' corresponding in curvature to the ball 2 and having a central opening 3d formed therein, and a flange-shaped urging portion 3a extending continuously from the ball receiving portion 3b. The urging portion 3a is located right above the protuberance 1e of the first sensor casing 1. In other words, the protuberance 1e and the urging portion 3a are located at an axially central portion of the first sensor unit 8. Further, the sensor arm 3 has its intermediate portion formed with a through hole 3c through which a pin 4 is penetrated such that the arm 3 is supported by the sensor casing 1 for rotation about the axis 4a of the pin 4.

As best shown in (a) and (b) of FIG. 5, the second sensor unit 9 is mainly composed of a second sensor casing 5, and a second sensor arm 6, which are also each formed of a synthetic resin molding. The elements 5, 6 are joined together by means of a pin 7.

The second sensor casing 5 has first and second hooks 5a and 5b projecting from an edge of an end wall 5A thereof. These hooks 5a, 5b are engaged in respective engaging holes 21a and 21b formed in the side wall of the retractor base 21 extending parallel with the direction in which the webbing 20 is to be unwound. The casing 5 has vertically extending opposite lateral side walls 5B and 5C which have their inner surfaces formed with recesses 5d and 5e in the form of U-shaped channels extending at right angles to the end wall 5A. The recesses 5d each have an end thereof opening in an end face of the side wall 5B, 5C remote from the end wall 5A, and the other end thereof terminating in an inner surface of the side wall 5B, 5C at a location close to the other end of the side wall 5B, 5C. The recesses 5e each extend from an axially central portion of the side wall 5B, 5C and opening at an end thereof in an end face of the side wall 5B, 5C close to the end wall 5A. Thus, the recesses 5d, 5e have their inner portions located in a fashion overlapping with each other in the axial direction of the casing 5. The side wall 5C has an arm mounting portion at its upper edge on which the second sensor arm 6 is mounted. The arm mounting portion has a pair of integral flanges 5f and 5g formed therein with through holes 5c and 5c through which the pin 7 extends.

The second sensor arm 6 is formed integrally with a pawl 6a as a free end and a projection 6b downwardly pending from an intermediate portion thereof. The other end of the arm 6 has a through hole 6c formed therein such that the arm is supported by the casing 5 by means of the pin 7 extending through the hole 6c for rotation about the axis 7a of the pin 7.

The first and second sensor units 8, 9 constructed as above can be put together into the sensor assembly 18 as shown in (a) of FIG. 6, for example. The assemblage is made by inserting the protuberances 1d, 1d of the first sensor casing 1 into the respective recesses 5d, 5d of the second sensor casing 5. The sensor assembly 18 of (a) of FIG. 6 is obtained by inserting the first sensor casing 1 into the second sensor casing 5 with the bottom wall 1b thereof as the leading edge. When each protuberance 1d has been fully fitted into the recess 5d, the protuberances 1e of the first sensor casing 1 becomes engaged in the respective recesses 5e of the second sensor casing 5 to complete the assemblage. In the thus assembled state, the flanged urging portion 3a of the first sensor arm 3 is in contact with the projection 6b of the second sensor arm 6. However, so long as the ball 2 stays in the depression 1b' in the bottom wall 1b of the casing 1, the arm 6 is not strongly urged by the arm 3.

(b) of FIG. 6 shows another or second sensor assembly 18' of the first and second sensor units according to the first embodiment, which is obtained by putting together the two members in a different manner from that in (a) of FIG. 6 described above, that is, by inserting the first sensor casing 1 into the second sensor casing 5 with an end of the first sensor arm 3 remote from the bottom wall 1b as the leading edge, instead of the bottom wall 1b as in (a) of FIG. 6.

It will be noted that the sensor assembly 18 of (a) of FIG. 6 and one 18' of (b) of FIG. 6 are symmetrical in shape with each other with respect to the bottom side 5f of the second sensor casing 5. More specfically, assuming that the counterclockwise direction as viewed in (a) and (b) of FIG. 6 is defined as a positive direction, the bottom wall 1b of the first sensor casing 1 is directed through an angle $\theta 1$ with respect to the bottom side 5f of the second sensor casing 5 extending normally to the axis of the base 21 in (a) of FIG. 6, while the former is directed through an angle $-\theta 1$ with respect to the latter in (b) of FIG. 6. Therefore, if a retractor incorporating the first sensor assembly 18 is mounted in a vehicle in a state counterclockwise inclined at the angle $(90° - \theta 1)$ with respect to the horizontal as shown in FIG. 1, and a retractor incorporating the second sensor assembly 18' in a state clockwise inclined at the angle $(90° - \theta 1)$ with respect to the horizontal as shown in FIG. 3, the bottom wall 1b of the first sensor casing 1 in either retractor is disposed to face right downward in the vehicle, that is, the two acceleration sensors are directed in the same direction.

In the retractor mounted as above and incorporating the sensor assembly 18 or 18', emergency locking means is formed by the pawl 6a of the second sensor arm 6 and the ratchet teeth 23a of the ratchet wheel 23. Specifically, when the retractor is given more than a predetermined degree of acceleration or inclined through more than a predetermined angle, the ball 2 will move to forcibly move the first sensor arm 3 in the clockwise direction as viewed in (a) of FIG. 6 or in the counterclockwise direction as viewed in (b) of FIG. 6. Then, the urging portion 3a of the first sensor arm 3 will push the projection 6b of the second sensor arm 6 so that the second sensor arm 6 will be turned in the clockwise direction as viewed in FIG. 2 for example to have its pawl 6a engaged into the teeth 23a of the ratchet wheel 23, that is, the emergency locking means is actuated.

FIGS. 7 and 8 show a second embodiment of the invention, which is distinguished from the first embodiment described above, in that, as shown in FIG. 7 similar to (a) of FIG. 4 referred to above, a bottom wall 11b of a first sensor casing 11 is inclined at an angle $\theta 2$ smaller than $\theta 1$ with respect to protuberances 11d formed on a first sensor casing 11. Due to this difference in the angle between the bottom wall 11b and the protuberances 11d, a first sensor arm 33 is different in shape from the first sensor arm 3 in the first embodiment in respect of the span between its mounting portion to the sensor casing 11 and its flanged urging portion 33a, etc. Also in the second embodiment, first and second sensor casings 11 and 55 can be assembled in two different ways into two kinds of sensor assemblies as shown in (a) and (b) of FIG. 8. Thus, two kinds of retractors having different mounting angles can be provided. The same second sensor casing 55 can be used to obtain the two sensor assemblies.

FIGS. 9 and 10 show a third embodiment of the invention.

FIG. 9 shows a first sensor unit of the third embodiment, which is distinguished from that in the first embodiment described above, in that, as shown in the figure, two protuberances 111d and 111d' are not symmetrical in location with each other, that is, they are not at the same height: the protuberance 111d' is located at a higher location than the protuberance 111d. On the other hand, as shown in (a) and (b) of FIG. 10, recesses formed in a second sensor casing 555 are not symmetrical in location with each other, that is, in (a) of FIG. 10 the left-side recess 555d' is higher in location than the right-side recess 555d, and in (b) of FIG. 10 the right-side recess 555d" is higher in location than the left-side recess 555d.

With the arrangement of the third embodiment, in the first sensor unit, if the first sensor casing 111 is to be mounted into the second sensor casing 555 with the bottom wall as the leading edge, the first sensor unit can be assembled only with the second sensor unit shown in (a) of FIG. 10, while if the first sensor casing is mounted into the second sensor casing with the first sensor arm as the leading edge, the first sensor unit can be assembled only with the second sensor unit shown in (b) of FIG. 10. If the second sensor unit shown in (a) of FIG. 10 is to be mounted at the right-side seat, and the second sensor unit shown in (b) of FIG. 10 at the left-side seat, respectively, only one kind of sensor assembly can be used at each of the right-side and left-side seats. Thus, according to the third embodiment, an error can be avoided that a first sensor unit for right-side seat is assembled with a wrong second sensor unit for left-side seat, and vice versa.

Although in the embodiments described above, the first sensor unit is provided with engaging protuberances and the second sensor unit is provided with engaging recesses, the former may be provided with recesses and the latter with protuberances, respectively.

Further, although in the embodiments described above the acceleration sensors according to the invention have been applied to retractors for safety belts for use in vehicles, this is not limitative to the invention, but they may be used over a variety of applications.

What is claimed is:

1. An acceleration sensor comprising:
    a first sensor unit having acceleration sensing means, and first mounting means; and
    a second sensor unit having actuator means actuatable in response to said acceleration sensing means, and second mounting means engageable with said first mounting means;
    said first and second mounting means being engageable with each other to selectively assemble said first and second sensor units in a first manner that said first sensor unit is inserted from one side thereof into said second sensor unit, wherein said first sensor unit is directed in a first direction with respect to said second sensor unit, and in a second manner that said first sensor unit is inserted from a side opposite to said one side thereof into said second sensor unit, wherein said first sensor unit is directed in a second direction opposite to said first direction with respect to said second sensor unit, said first sensor unit assembled with said second sensor unit in said first manner being symmetrical with said first sensor unit assembled with said second sensor unit in said second manner with respect to said second sensor unit.

2. An acceleration sensor as claimed in claim 1, wherein said first sensor unit comprises a spherical weight forming said acceleration sensing means, a first sensor casing accommodating said spherical weight, and a first sensor arm actuatable in response to movement of said spherical weight,
    said second sensor unit comprising a second sensor casing combined with said first sensor casing, and a second sensor arm forming said actuator means and actuatable in response to actuation of said first sensor arm.

3. An acceleration sensor as claimed in claim 2, wherein said first mounting means comprises at least one first protuberance formed on said first sensor casing, and at least one second protuberance formed on said first sensor casing at an axially central portion thereof,
    said second mounting means comprising at least one first recess formed in said second sensor casing, said at least one first protuberance being disengageably engaged, respectively, in said at least one first recess and cooperating therewith to serve as guide means for causing said first sensor casing to be engaged into said second sensor casing, and at least one second recess formed in said second sensor casing at such a location that it engages a respective one of said at least one second protuberance when said first sensor casing is brought into a predetermined position within said second sensor casing.

4. A safety belt retractor for use in a vehicle, comprising:
    a base;
    a webbing takeup shaft rotatably mounted on said base;
    an acceleration sensor comprising a first sensor unit having acceleration sensing means, and first mounting means, and a second sensor unit having actuator means actuatable in response to said acceleration sensing means, and second mounting means engageable with said first mounting means, said first and second mounting means being engageable with each other to selectively assemble said first and second sensor units in a first manner that said first sensor unit is inserted from one side thereof into said second sensor unit, wherein said first sensor unit is directed in a first direction with respect to said second sensor unit, and in a second manner that said first sensor unit is inserted from a side opposite to said one side thereof into said second sensor unit, wherein said first sensor unit is directed in a second direction opposite to said first direction with respect to said second sensor unit, said first sensor unit assembled with said second sensor unit in said first manner being symmetrical with said first sensor unit assembled with said second sensor unit in said second manner with respect to said second sensor unit; and
    means responsive to said actuator means of said acceleration sensor for inhibiting rotation of said takeup shaft in a direction of webbing being unwound;
    said retractor being mounted in said vehicle in a first position when said first and second sensor units of said acceleration sensor are assembled in said first manner, and in a second position symmetrical with said first position when said first and second sensor units are assembled in said second manner.

5. An acceleration sensor comprising:
a first sensor unit having acceleration sensing means, and first mounting means;
a second sensor unit having first actuator means actuatable in response to said acceleration sensing means, and second mounting means engageable with said first mounting means; and
a third sensor unit having second actuator means actuatalbe in response to said acceleration sensing means, and second mounting means engageable with said first mounting means;
said first and second mounting means being engageable with each other to assemble said first and second sensor units solely in a first manner that said first sensor unit is inserted from one side thereof into said second sensor unit, wherein said first sensor unit is directed in a first direction with respect to said second sensor unit;
said first and third mounting means being engageable with each other to assemble said first and third sensor units solely in a second manner that said first sensor unit is inserted from a side opposite to said one side thereof into said third sensor unit, wherein said first sensor unit is directed in a second direction opposite to said first direction with respect to said third sensor unit if the latter is directed in the same direction as said second sensor unit.

6. An acceleration sensor as claimed in claim 5, wherein said first sensor unit comprises a spherical weight forming said acceleration sensing means, a first sensor casing accommodating said spherical weight, and a first sensor arm actuatable in response to movement of said spherical weight, said second and third sensor units each comprising a second sensor casing combined with said first sensor casing, and a second sensor arm forming said first or second actuator means and actuatable in response to actuation of said first sensor arm.

7. An acceleration sensor as claimed in claim 6, wherein said first mounting means comprises at least one pair of first protuberances formed on said first sensor casing at opposite lateral sides thereof, and at least one second protuberance formed on said first sensor casing at an axially central portion thereof,
said second mounting means comprising at least one pair of first recesses formed in said second sensor casing at opposite lateral sides thereof, said first protuberances being disengageably engaged, respectively, in said first recesses only when said first sensor casing is directed in a first predetermined direction with respect to said second sensor casing, said first protuberances cooperating with said first recesses to serve as guide means for causing said first sensor casing to be engaged into said second sensor casing, and at least one second recess formed in said second sensor casing at such a location that it engages a respective one of said at least one second protuberance when said first sensor casing is brought into a predetermined position within said second sensor casing,
said third mounting means comprising at least one pair of third recesses formed in said third casing at opposite lateral sides thereof, said first protuberances being disengageably engaged, respectively, in said third recesses only when said first sensor casing is directed in a second predetermined direction opposite to said first predetermined direction with respect to said third sensor casing of the latter is directed in the same direction as said second sensor casing, said first protuberances cooperating with said third recesses to serve as guide means for causing said first sensor casing to be engaged into said third sensor casing, and at least one fourth recess formed in said third sensor casing at such a location that it engages a respective one of said at least one second protuberance when said first sensor casing is brought into a predetermined position within said third sensor casing.

8. A safety belt retractor for use in a vehicle, comprising:
a base;
a webbing takeup shaft rotatably mounted on said base;
an acceleration sensor comprising a first sensor unit having acceleration sensing means, and first mounting means, a second sensor unit having first actuator means actuatable in response to said acceleration sensing means, and second mounting means engageable with said first mounting means, and a third sensor unit having second actuator means actuatable in response to said acceleration sensing means, and third mounting means engageable with said first mounting means, said first and second mounting means being engageable with each other to assemble said first and second sensor units solely in a first manner that said first sensor unit is inserted from one side thereof into said second sensor unit, wherein said first sensor unit is directed in a first direction with respect to said second sensor unit, said first and third mounting means being engageable with each other to assemble said first and third sensor units solely in a second manner that said first sensor unit is inserted from a side opposite to said one side thereof into said third sensor unit, wherein said first sensor unit is directed in a second direction opposite to said first direction with respect to said third sensor unit if the latter is directed in the same direction as said second sensor unit; and
means responsive to said first or second actuator means of said acceleration sensor for inhibiting rotation of said takeup shaft in a direction of webbing being unwound;
said retractor being mounted in said vehicle in a first position when said first and second sensor units of said acceleration sensor are assembled in said first manner, and in a second position symmetrical with said first position when said first and third sensor units are assembled in said second manner.

* * * * *